United States Patent
Ng et al.

(10) Patent No.: US 10,269,279 B2
(45) Date of Patent: Apr. 23, 2019

(54) DISPLAY SYSTEM AND METHOD FOR DELIVERING MULTI-VIEW CONTENT

(71) Applicant: Misapplied Sciences, Inc., Redmond, WA (US)

(72) Inventors: Albert Han Ng, Redmond, WA (US); Paul Henry Dietz, Redmond, WA (US); David Steven Thompson, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 0 days.

(21) Appl. No.: 15/469,220

(22) Filed: Mar. 24, 2017

(65) Prior Publication Data
US 2018/0277032 A1 Sep. 27, 2018

(51) Int. Cl.
*G06F 3/14* (2006.01)
*G09G 3/02* (2006.01)
(Continued)

(52) U.S. Cl.
CPC .............. *G09G 3/02* (2013.01); *G06F 3/1446* (2013.01); *G09G 3/002* (2013.01); *G09G 3/2003* (2013.01);
(Continued)

(58) Field of Classification Search
CPC ........... G06T 11/60; G06T 7/90; G09F 19/14; G09G 3/006; G09G 2320/028; G09G 2330/12; G09G 2340/10; H04N 13/0047
See application file for complete search history.

(56) References Cited

U.S. PATENT DOCUMENTS

| 5,855,425 A | 1/1999 | Hamagishi |
| 6,339,421 B1 | 1/2002 | Puckeridge |

(Continued)

FOREIGN PATENT DOCUMENTS

| EP | 2 685 735 A1 | 1/2014 |
| WO | 02/24470 A1 | 3/2002 |

(Continued)

OTHER PUBLICATIONS

International Search Report, dated Jun. 21, 2018, for International Application No. PCT/US2018/024024, 3 pages.
(Continued)

*Primary Examiner* — Shaheda A Abdin
(74) *Attorney, Agent, or Firm* — Seed IP Law Group LLP

(57) ABSTRACT

A display system includes one or more multi-view (MV) pixels, each configured to emit beamlets in different directions in a beamlet coordinate system. The display system includes an input node which receives a specification of multiple viewing zones located relative to the MV pixels in a viewing zone coordinate system, and a processor coupled to the input node. The processor associates multiple contents with the multiple viewing zones, respectively, and determines a mapping that translates between the viewing zone coordinate system and the beamlet coordinate system. For each of multiple images generated from the multiple contents, the processor, using the mapping, identifies a bundle of beamlets from each of the MV pixels directed to one viewing zone to form the image. The processor outputs control signaling that defines color and brightness of each of the beamlets in each bundle to project the corresponding image to the corresponding viewing zone. The MV pixels, in response to the control signaling, project the multiple images to the multiple viewing zones, respectively.

22 Claims, 10 Drawing Sheets

(51) Int. Cl.
*G09G 3/00* (2006.01)
*G09G 5/10* (2006.01)
*G09G 3/20* (2006.01)

(52) U.S. Cl.
CPC ......... *G09G 5/10* (2013.01); *G09G 2300/046* (2013.01); *G09G 2300/0469* (2013.01); *G09G 2320/028* (2013.01); *G09G 2320/0261* (2013.01); *G09G 2320/068* (2013.01); *G09G 2320/0686* (2013.01); *G09G 2340/10* (2013.01); *G09G 2340/14* (2013.01); *G09G 2354/00* (2013.01)

(56) References Cited

U.S. PATENT DOCUMENTS

| | | | |
|---|---|---|---|
| 6,377,295 | B1 | 4/2002 | Woodgate et al. |
| 7,001,023 | B2 | 2/2006 | Lee et al. |
| 7,462,104 | B2 | 12/2008 | De Cesare |
| 7,602,395 | B1 | 10/2009 | Diard |
| 7,990,498 | B2 | 8/2011 | Hong |
| 8,461,995 | B1 | 6/2013 | Thornton |
| 9,080,279 | B2 | 7/2015 | Jun et al. |
| 9,396,588 | B1 | 7/2016 | Li |
| 9,715,827 | B2 | 7/2017 | Ng et al. |
| 9,743,500 | B2 | 8/2017 | Dietz et al. |
| 9,792,712 | B2 | 10/2017 | Ng et al. |
| 2003/0065805 | A1 | 4/2003 | Barnes, Jr. |
| 2003/0115096 | A1 | 6/2003 | Reynolds et al. |
| 2003/0156260 | A1 | 8/2003 | Putilin et al. |
| 2004/0252374 | A1* | 12/2004 | Saishu ............... G02B 27/2214 359/462 |
| 2005/0093986 | A1 | 5/2005 | Shinohara et al. |
| 2005/0195330 | A1 | 9/2005 | Zacks et al. |
| 2009/0109126 | A1 | 4/2009 | Stevenson et al. |
| 2009/0273486 | A1 | 11/2009 | Sitbon |
| 2010/0002079 | A1 | 1/2010 | Krijn et al. |
| 2010/0085517 | A1 | 4/2010 | Hong |
| 2010/0207961 | A1 | 8/2010 | Zomet |
| 2010/0214537 | A1 | 8/2010 | Thomas |
| 2011/0159929 | A1 | 6/2011 | Karaoguz et al. |
| 2011/0169863 | A1 | 7/2011 | Kawai |
| 2011/0216171 | A1 | 9/2011 | Barre et al. |
| 2011/0242298 | A1 | 10/2011 | Bathiche et al. |
| 2011/0304613 | A1 | 12/2011 | Thoresson |
| 2012/0026157 | A1 | 2/2012 | Unkel et al. |
| 2012/0062565 | A1 | 3/2012 | Fuchs et al. |
| 2012/0105445 | A1 | 5/2012 | Sakai et al. |
| 2012/0114019 | A1 | 5/2012 | Wallace et al. |
| 2012/0140048 | A1 | 6/2012 | Levine |
| 2012/0218253 | A1 | 8/2012 | Clavin |
| 2012/0268451 | A1* | 10/2012 | Tsai ................... G02B 27/2214 345/419 |
| 2013/0013412 | A1 | 1/2013 | Altman et al. |
| 2013/0093752 | A1 | 4/2013 | Yuan |
| 2013/0169765 | A1 | 7/2013 | Park et al. |
| 2013/0282452 | A1 | 10/2013 | He |
| 2014/0015829 | A1 | 1/2014 | Park et al. |
| 2014/0035877 | A1 | 2/2014 | Cai et al. |
| 2014/0061531 | A1 | 3/2014 | Faur et al. |
| 2014/0111101 | A1 | 4/2014 | McRae |
| 2014/0300711 | A1* | 10/2014 | Kroon ................. H04N 13/302 348/51 |
| 2015/0020135 | A1 | 1/2015 | Frusina et al. |
| 2015/0042771 | A1 | 2/2015 | Jensen et al. |
| 2015/0049176 | A1 | 2/2015 | Hinnen et al. |
| 2015/0062314 | A1 | 3/2015 | Itoh |
| 2015/0085091 | A1 | 3/2015 | Varekamp |
| 2015/0092026 | A1 | 4/2015 | Baik et al. |
| 2015/0198940 | A1 | 7/2015 | Hwang et al. |
| 2015/0229894 | A1 | 8/2015 | Dietz |
| 2015/0279321 | A1 | 10/2015 | Falconer et al. |
| 2015/0334807 | A1 | 11/2015 | Gordin et al. |
| 2015/0356912 | A1 | 12/2015 | Dietz |
| 2016/0012726 | A1 | 1/2016 | Wang |
| 2016/0210100 | A1 | 7/2016 | Ng et al. |
| 2016/0212417 | A1 | 7/2016 | Ng et al. |
| 2016/0224122 | A1 | 8/2016 | Dietz et al. |
| 2016/0227201 | A1 | 8/2016 | Ng et al. |
| 2016/0261837 | A1 | 9/2016 | Thompson et al. |
| 2016/0261856 | A1 | 9/2016 | Ng et al. |
| 2016/0293003 | A1 | 10/2016 | Ng et al. |
| 2016/0341375 | A1 | 11/2016 | Baker |
| 2016/0341377 | A1 | 11/2016 | Eddins |
| 2016/0366749 | A1 | 12/2016 | Dietz et al. |
| 2016/0371866 | A1 | 12/2016 | Ng et al. |
| 2017/0205889 | A1 | 7/2017 | Ng et al. |

FOREIGN PATENT DOCUMENTS

| | | |
|---|---|---|
| WO | 2013/183108 A1 | 12/2013 |
| WO | 2016/118622 A1 | 7/2016 |
| WO | 2016/141248 A1 | 9/2016 |

OTHER PUBLICATIONS

International Search Report, dated Jun. 3, 2016, for International Application No. PCT/US2016/014122, 3 pages.
International Search Report, dated May 12, 2016, for International Application No. PCT/US2016/020784, 4 pages.
International Search Report, dated Sep. 29, 2016, for International Application No. PCT/US2016/037185, 4 pages.

* cited by examiner

DISPLAY SYSTEM AND METHOD FOR DELIVERING MULTI-VIEW CONTENT

BACKGROUND

Technical Field

This disclosure relates to a display system and method, and particularly to a display system and method capable of forming multiple images at multiple viewing zones using one or more multi-view (MV) pixels.

Description of the Related Art

With advancement in display technology, display devices have become smaller, thinner and cheaper, with crisper images. The fundamental functionality of a display device, however, has remained substantially the same—a display device forms an image that simultaneously appears the same to viewers at all locations from which the display device can be seen.

BRIEF SUMMARY

According to an exemplary embodiment, a display system is provided which includes one or more multi-view (MV) pixels, wherein each MV pixel is configured to emit beamlets (individually controllable beams) in different directions in a beamlet coordinate system. The display system includes an input node which, in operation, receives a specification of multiple viewing zones located relative to the MV pixels in a viewing zone coordinate system. The display system includes a processor which is coupled to the input node. The processor associates multiple contents with the multiple viewing zones, respectively. The processor, in operation, determines (e.g., identifies, accesses) a mapping that translates between the viewing zone coordinate system (where the multiple viewing zones are specified) and the beamlet coordinate system (where the MV-pixel beamlets are emitted in different directions). For each of multiple images generated from the multiple contents, the processor, using the mapping between the two coordinate systems, identifies a bundle of beamlets from each of the MV pixels directed to one viewing zone to form the image. The bundle of beamlets directed to one viewing zone to form one image is different from the bundle of beamlets directed to another viewing zone to form another image. The processor outputs control signaling for the MV pixels, wherein the control signaling defines color and brightness of each of the beamlets in each bundle to project the corresponding image to the corresponding viewing zone. The MV pixel(s), in response to the control signaling from the processor, project the multiple images to the multiple viewing zones, respectively.

The display system constructed as described above uses a mapping that translates between the beamlet coordinate system, in which beamlets are emitted in different directions from each of the MV pixels, and the viewing zone coordinate system, in which multiple viewing zones are specified. Multiple contents are associated with the multiple viewing zones, respectively. The display system uses the mapping to identify a bundle of beamlets from each of the MV pixels directed to one viewing zone to form an image generated from the content associated with the viewing zone. The display system is capable of performing the same operation for each of the multiple viewing zones to project multiple (e.g., different) images generated from the multiple contents respectively associated with the multiple viewing zones.

The "image" as used herein may comprise one or more of a static image, a stream of images (e.g., video), a text pattern (e.g., messages, signage), a lighting pattern, and any other expression of content that is visible to human eyes.

In various embodiments, the processor associates the multiple contents with the multiple viewing zones by associating the multiple contents themselves with the multiple viewing zones, or by associating multiple content descriptors (e.g., content providers, content types) of the multiple contents with the multiple viewing zones.

In various embodiments, the display system includes a user-interface device which, in operation, receives an operator specification of the multiple viewing zones and sends the specification of the multiple viewing zones to the input node. The user-interface device may include a screen (e.g., touchscreen) capable of displaying a viewing area and specifying the multiple viewing zones in the viewing area in response to one or both of graphical input and textual input. For example, an operator may graphically specify perimeters of the multiple viewing zones (e.g., by "drawing" enclosure boxes), or textually specify coordinates of the multiple viewing zones in the viewing zone coordinate system.

In various embodiments, the display system may include a sensor configured to identify the multiple viewing zones and to send the specification of the multiple viewing zones to the input node. For example, the sensor may be configured to detect locations of multiple targets and specify the detected locations of the multiple targets as the multiple viewing zones. The multiple targets may be multiple viewers themselves (who may gesture to the sensor, for example) or multiple viewer surrogates, i.e., elements used to locate and/or track multiple viewers, such as tags the viewers may wear, trackable mobile devices (e.g., smartphones, wands) the viewers may carry, conveyances that may transport the viewers such as vehicles, or any other types of markers that may represent the viewers. When the sensor is used to identify locations of multiple targets that are moving, the input node of the display system may receive a new specification of new multiple viewing zones based on the identified locations of the multiple targets that have moved. The processor associates multiple contents with the new multiple viewing zones, respectively, and, for each of the multiple images generated from the multiple contents, uses the mapping that translates between the viewing zone coordinate system and the beamlet coordinate system to identify a bundle of beamlets from each of the MV pixels directed to each new viewing zone to form the image. The display system is capable of projecting the multiple images to the new multiple viewing zones, respectively. The multiple contents associated with the new multiple viewing zones may be updated from the multiple contents previously associated with the (old) multiple viewing zones.

In a further aspect, a display method is provided, which generally corresponds to an operation of the display system described above. The method includes generally six steps:

1) receiving a specification of multiple viewing zones located in a viewing zone coordinate system, wherein the multiple viewing zones are positioned relative to one or more multi-view (MV) pixels, and each MV pixel is configured to emit beamlets in different directions in a beamlet coordinate system;

2) associating multiple contents with the multiple viewing zones, respectively;

3) determining a mapping that translates between the viewing zone coordinate system and the beamlet coordinate system;

4) for each of multiple images generated from the multiple contents, using the mapping, identifying a bundle of beamlets from each of the MV pixels directed to one viewing zone to form the image, wherein the bundle of beamlets directed to one viewing zone to form one image is different from the bundle of beamlets directed to another viewing zone to form another image;

5) generating control signaling for the MV pixels, the control signaling defining color and brightness of each of the beamlets in each bundle to project the corresponding image to the corresponding viewing zone; and 6) in response to the control signaling, projecting, from the MV pixels, the multiple images to the multiple viewing zones, respectively.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description. Thus, the specific details set forth are merely exemplary. Particular implementations may vary from these exemplary details and still be contemplated to be within the scope of the present invention. Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
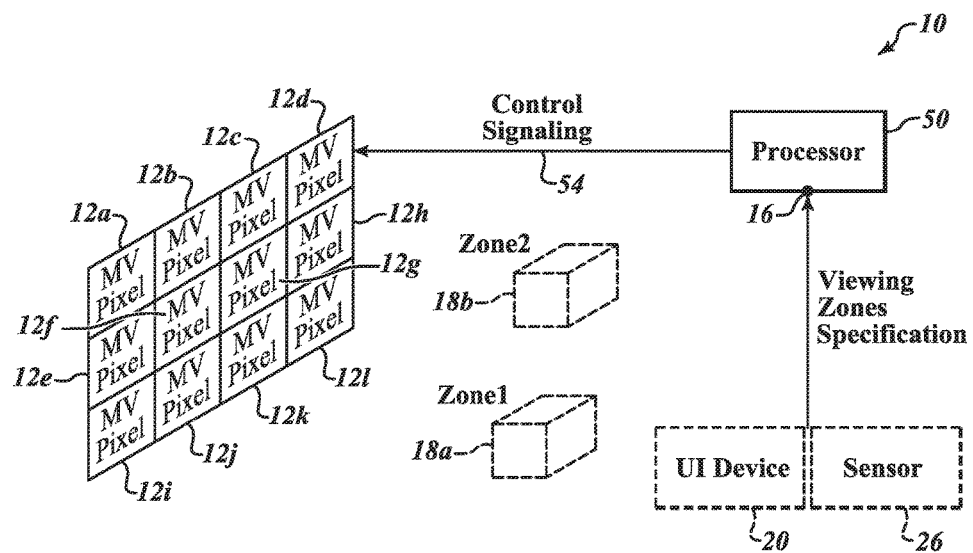
FIG. 1 depicts an embodiment of a display system.
Figure 6:
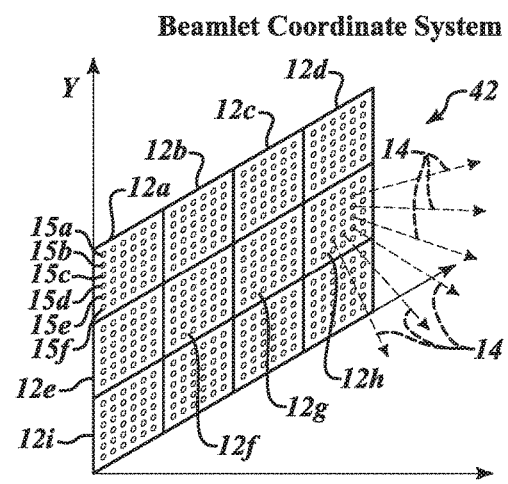
FIG. 6 depicts a beamlet coordinate system according to an embodiment.

FIG. 1 is a system diagram depicting an embodiment of a display system 10. The display system 10 includes one or more multi-view (MV) pixels 12 (twelve MV pixels 12a-12l are included in the illustrated example), wherein each MV pixel 12 is configured to emit beamlets 14 in different directions in a beamlet coordinate system 42, as depicted in FIG. 6. "Beamlets" as used herein means individually controllable beams emitted from an MV pixel. FIG. 6 illustrates one of the MV pixels 12a-12l emitting multiple beamlets 14 in multiple directions. Unlike an image projector that emits a number of light beams to form an image on a screen, the beamlets 14 from each MV pixel 12 are intended to fall upon the eyes of multiple viewers, such that the multiple viewers respectively see different beamlets (e.g., in different colors and brightness) originating from the same MV pixel 12. As a consequence, the appearance of each MV pixel 12 from the perspective of a viewer is dependent upon the angle at which the viewer looks to the MV pixel 12. For ease of illustration the MV pixel 12h is depicted to emit a few beamlets 14 in FIG. 6, though it should be understood that many more beamlets 14 may be emitted from the MV pixel 12h and from any of the other MV pixels 12.

Figure 3:
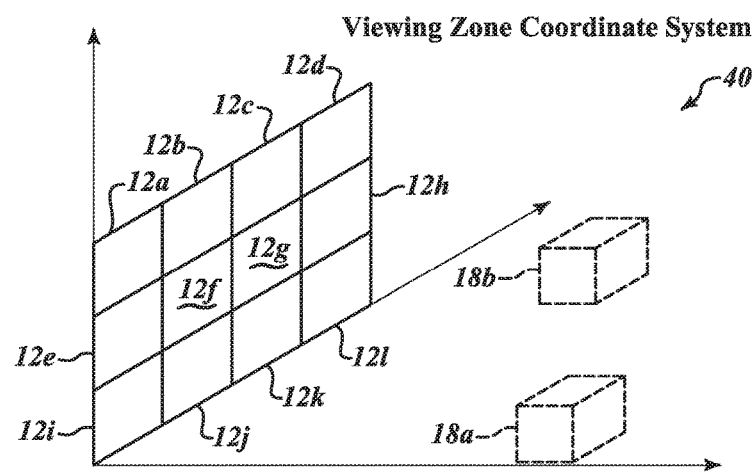
FIG. 3 depicts a viewing zone coordinate system in 3D according to an embodiment.

Referring back to FIG. 1, the display system 10 includes an input node 16 which, in operation, receives a specification of multiple viewing zones 18a ("ZONE 1") and 18b ("ZONE 2") located in a viewing zone coordinate system 40, as additionally depicted in FIG. 3. The input node 16 permits receiving information, data, and/or signaling from other devices or systems (e.g., UI devices, sensors, storage devices, content servers) via any suitable medium including wireline and/or wireless medium, and via any suitable protocol (e.g., Bluetooth, Wi-Fi, cellular, optical, ultrasound).

FIG. 3 illustrates the two viewing zones 18a and 18b, respectively specified as three-dimensional volumes (e.g., boxes), located relative to the one or more MV pixels 12a-12l. Each viewing zone 18 defines an observation point at which an image formed by the one or more MV pixels 12a-12l is visible. Thus, the viewing zone 18 may be defined as a three-dimensional volume (a collection of observation points in 3D), as a two-dimensional area (a collection of observation points in 2D), or as a point.

The viewing zone coordinate system 40 may be any suitable coordinate system, such as a Cartesian coordinate system, or a polar coordinate system in which multiple viewing zones are positioned to surround the one or more MV pixels, for example. Any suitable 3D space modeling method may be used to define the viewing zone coordinate system 40, such as a map, point cloud, wire polygon mesh, and textured polygon mesh. In some embodiments, the viewing zone coordinate system 40 may be based on the physical dimensions of a viewing area in which the multiple viewing zones 18 are defined.

In some embodiments, the viewing zone coordinate system 40 may be within sight of a 3D sensor attached to the MV pixels (e.g., a depth sensor, a stereoscopic camera) and the viewing zone coordinate system 40 can be the 3D coordinate system of the 3D sensor. For example, a real-life 3D environment is scanned by a 3D sensor (e.g., stereoscopic camera) to derive the 3D viewing zone coordinate system 40, in which multiple viewing zones may be specified.

Figure 4:
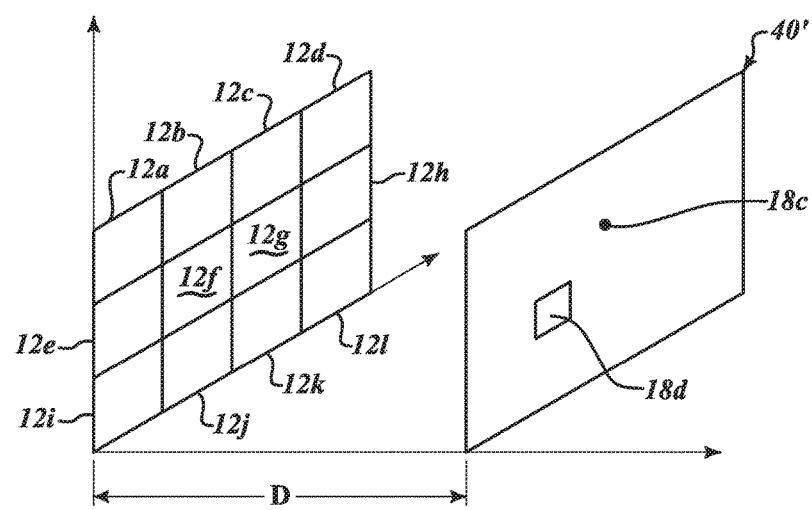
FIG. 4 depicts a viewing zone coordinate system in 2D according to an embodiment.

In other embodiments, the viewing area may be within sight of a 2D camera attached to the MV pixels, wherein the 2D camera is used as a sensor to identify the multiple viewing zones. In this case the viewing zone coordinate system 40 is based on the 2D pixel coordinate system of the 2D camera. For example, FIG. 4 illustrates a sample viewing zone coordinate system 40' in 2D, which may be based on the 2D pixel coordinate system of the 2D camera (not shown). In this example, the 2D viewing zone coordinate system 40' is set on a plane at a distance D from the one or more MV pixels 12a-12l. A point 18c or an area 18d may be specified in the 2D viewing zone coordinate system 40' to represent a viewing zone. It is noted that the 2D viewing zone coordinate system 40' may be in a shape other than a plane, such as a hemisphere or other non-planar surface. In some embodiments, it may be desirable for each point in the 2D viewing zone coordinate system 40' to have a unique viewing angle to the MV pixels 12a-12l, such that the bundle of beamlets directed towards each viewing zone, which is formed of one or more of those points each having a unique viewing angle, can be uniquely identified. Then, multiple non-overlapping viewing zones in the 2D viewing zone coordinate system 40' may be associated with (or "hit" by) mutually exclusive bundles of beamlets.

Figure 5A:
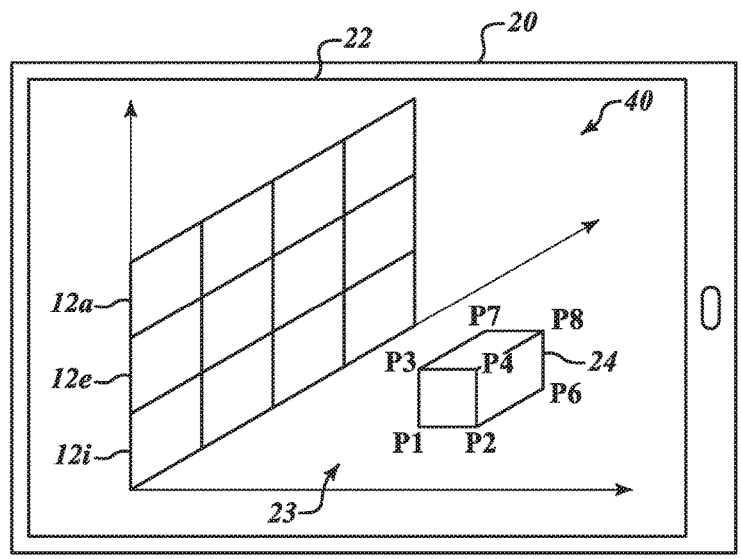
FIG. 5A depicts a sample screen view of a user interface device usable to specify multiple viewing zones in a viewing area relative to the MV pixel(s).

Multiple viewing zones 18 may be specified in various ways. According to some embodiments, the display system 10 may include a user-interface (UI) device 20 which, in operation, receives an operator specification of the multiple viewing zones 18 and sends the specification of the multiple viewing zones to the input node 16, as shown in FIG. 1. FIG. 5A illustrates a sample UI device 20, which includes a screen 22 (e.g., touchscreen) capable of displaying a representation of a viewing area 23 relative to the one or more MV pixels 12a-12l in the viewing zone coordinate system 40. The UI device 20 in these embodiments may be any of a tablet computer, as depicted in FIG. 5A, a laptop or desktop computer, or any electronic device that includes a screen (e.g., smartphone) and is capable of running a viewing zone specification application configured to permit specification of multiple viewing zones 18 in the viewing area 23. The operator may specify a viewing zone in the viewing area 23 in the viewing zone coordinate system 40 via the screen 22 (e.g., touchscreen) or keyboard or any other input device (not shown) of the UI device 20.

The operator may specify each viewing zone graphically, for example, by "drawing" a point, a 2D shape (e.g., a polygon, circle, oval, freeform shape) and/or a 3D shape (e.g., a box, sphere) that represents an observation point or represents (e.g., encloses) a collection of observation points. In the illustrated example of FIG. 5A, the operator has drawn a 3D shape of a box 24 that encloses a collection of observation points, from which a particular image should be visible. The graphically-input multiple viewing zones 18 may be represented as shapes or other indicia superimposed on the viewing area 23 on the screen of the UI device 20. Additionally or alternatively, the operator may specify the multiple viewing zones 18 by text, for example, by entering the coordinates of the vertices (P1-P8) of a box 24 that defines each viewing zone via a keyboard of the UI device 20.

In some embodiments, the UI device 20 need not include a screen capable of displaying a viewing area, for example, when the operator may not require a visualization of the viewing area in order to specify multiple viewing zones. In these embodiments, the UI device 20 need only include a component configured to receive the operator specification of multiple viewing zones. The component may be, without limitation, a keyboard or keypad on which the operator may type indications (e.g., seat numbers, section numbers) corresponding to viewing zones; a microphone into which the operator may speak indications of viewing zones; a touch/gesture-sensitive pad on which the operator may tap/gesture indications of viewing zones; an optical pointer the operator may use to point into the viewing area to specify each viewing zone, etc.

Figure 5B:
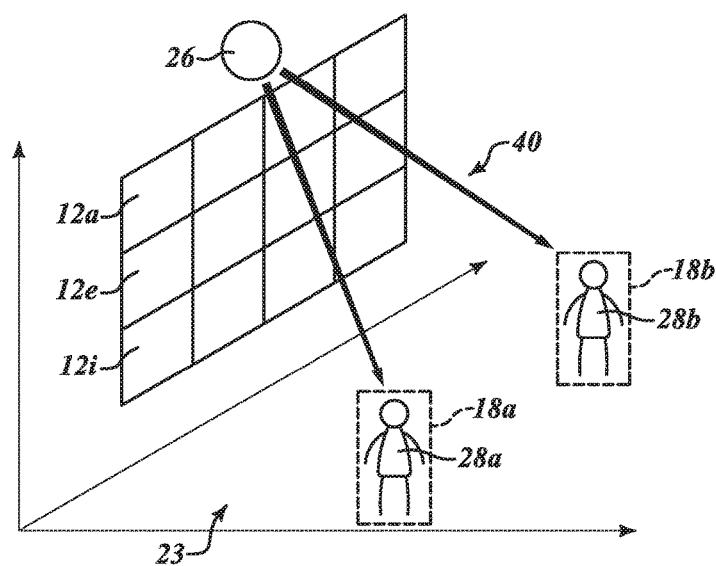
FIG. 5B depicts sample use of a sensor to specify multiple viewing zones based on multiple targets whose locations are identified by the sensor.

According to other embodiments, the display system 10 may include a sensor 26 configured to identify the multiple viewing zones 18 and to send the specification of the multiple viewing zones to the input node 16, as shown in FIG. 1. FIG. 5B illustrates a sample sensor 26, which can identify (e.g., detect) locations of multiple targets 28a and 28b and specify the identified locations of the multiple targets 28a and 28b as the multiple viewing zones 18a and 18b in the viewing zone coordinate system 40. The sensor 26 may be based on any suitable sensing technology including, without limitation, an optical sensor (e.g., camera, video camera, infrared sensor), an electromagnetic (EM) interrogation system sensor capable of tracking an active object, a GPS system sensor capable tracking an active object, an RF sensor (e.g., RFID system including a reader capable of interrogating an RFID tag), an RF triangulation technique-based sensor, and a radar sensor. In some embodiments multiple sensors may be used, which are suitably located relative to each other and relative to the viewing area 23 to identify multiple viewing zones that may be specified in the viewing area 23. Multiple sensors of the same type, or of different types, may be used together.

For example, one or more cameras having suitable lenses and lighting may be used as a sensor that can recognize and locate multiple targets 28 to correspondingly specify the multiple viewing zones 18. In some embodiments, the camera(s) may be depth-aware cameras, such as structured light or time-of-flight cameras, which can generate a depth map of what is being seen through the camera at a short range. The depth map may then be processed to approximate a 3D representation of what is being seen. In other embodiments, the camera(s) may be stereoscopic cameras and/or LIDAR sensors.

In the illustrated example of FIG. 5B, the sensor 26 detects locations of potential viewers as the multiple targets 28a and 28b, and specifies the detected locations of the viewers as the multiple viewing zones 18a and 18b. For example, a point, a 2D shape and/or a 3D shape may be assigned to each detected target 28 (e.g., a 3D box that encloses the target 28), and the assigned point, 2D shape and/or 3D shape may be used to specify the viewing zone 18 of the target 28. The processing to specify multiple viewing zones based on the locations of the multiple targets 28a, 28b identified by the sensor 26 may be performed by a processor of the sensor 26 and/or a processor 50 of the display system 10, to be described below.

In further embodiments, the sensor may be configured to identify (e.g., pick up) attributes of the viewing zone, such as audio (e.g., speech or other sound made by a viewer or viewer surrogate), temperature (e.g., heat emanating from a viewer or viewer surrogate), etc. The identified attributes may be used, for example, by a zones-and-contents association module 36 of the processor 50, to be described below, to select or generate appropriate content for the viewing zone (e.g., a cold drink advertisement selected/generated for a viewer in a high-temperature viewing zone).

FIG. 6 schematically depicts the beamlet coordinate system 42, which may be any suitable coordinate system such as a Cartesian coordinate system and a polar coordinate system. The beamlet coordinate system 42 identifies each of the beamlets emitted from each MV pixel 12, which follows a specific propagation path. For example, the propagation path of each beamlet may be defined by the beamlet's origin in the MV pixel and the (unit) vector that defines its propagating direction, or may be characterized by a combination of angles such as azimuth α and altitude β angles formed by the beamlet. As further examples, any suitable 3D space modeling method may be used to define the beamlets' propagation paths in the beamlet coordinate system 42, such as a point cloud method that specifies a set of data points that form each propagation path or a voxel data method that specifies a set of voxels (a volume having unit x-y-z dimensions) that form each propagation path. Other 3D modeling methods may be used, such as a 3D map, wire polygon mesh, and textured polygon mesh. In some embodiments, as illustrated in FIG. 6, the beamlet coordinate system 42 explicitly identifies each of the beamlets by the beamlet's origin 15a, 15b, 15c . . . , in each MV pixel 12a, wherein each beamlet's origin is implicitly associated with its propagation path. In other embodiments, the beamlet coordinate system 42 may explicitly identify each of the propagation paths of the beamlets.

In some embodiments, the propagation path of each beamlet may be found based on a geometric model of the one or more MV pixels. For example, the geometric definitions of and relationships among the beamlets of an MV pixel may be found in a factory via calibration measurements, or may be inferred from the opto-mechanical design of the MV pixel, such as a known radial distortion of a lens included in the MV pixel. In various embodiments, the beamlets (e.g., the sources of the beamlets) in each MV pixel are arranged in a geometric array (e.g., 2D array, circular array). Propagation paths of the beamlets arranged in a geometric array can be geometrically defined using any suitable mathematical techniques including, without limitation, linear interpolation; linear extrapolation; non-linear interpolation; non-linear extrapolation; Taylor-series approximation; linear change of reference frame; non-linear change of reference frame; polynomial, spherical and/or exponential models; and trigonometric manipulation. As a particular example, once the propagation paths of selected beamlets are geometrically defined, suitable interpolation techniques may be used to find the propagation paths of the beamlets between those geometrically-defined beamlets. In other embodiments, the propagation path of each beamlet may be found by flashing patterns on the MV pixels (e.g., by selectively turning on and off the beamlets on each MV pixel) to uniquely encode every beamlet, and capturing the images of the flashing patterns using a camera placed in a viewing area of the MV pixels. The captured images can then be plotted onto the beamlet coordinate system 42 to geometrically define respective propagation paths of the beamlets. Various encoding patterns may be used as the flashing patterns, including, without limitation, Gray-code patterns, non-return-to-zero (NRZ) digital sequences, amplitude-shift-keyed (ASK) bits, maximum-length sequences, and shift-register sequences.

Although beamlets 14 are depicted in the accompanying figures as simple lines with arrowheads indicating their directions of emission, they can have an angular component and can be in any shape. Thus, characterization of the beamlet as a simple line is an approximation, which is a valid model in some embodiments but in other embodiments the beamlet may be modeled as having a shape similar to the beam from a search light, for example. In various exemplary embodiments, each beamlet 14 is wide/large enough such that both eyes of a viewer are expected to be within the beamlet 14 and the beamlet 14 falls upon both eyes of the viewer. Thus, the viewer sees the same beamlet 14 (e.g., the same color and brightness) with both of the eyes. In other embodiments, each beamlet 14 is narrow/small enough such that two different beamlets 14 are individually controlled to fall upon two eyes of a viewer, respectively. In this case the viewer sees two beamlets 14 of possibly different colors and/or brightness with his/her two eyes, respectively.

Figure 2:
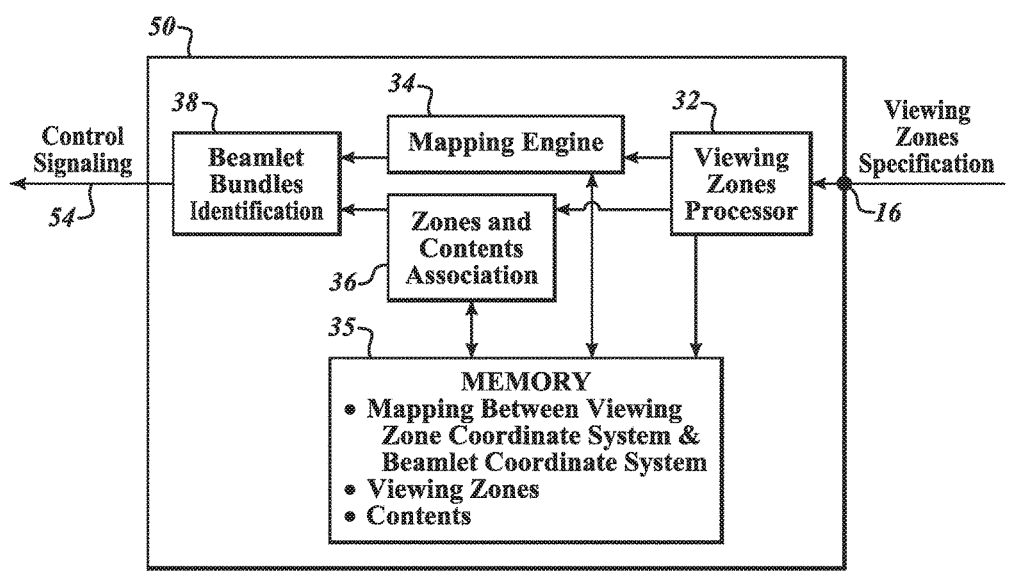
FIG. 2 depicts an embodiment of a processor of the display system.

Returning to FIG. 1, the display system 10 includes the processor (controller) 50 coupled to the input node 16. Referring additionally to FIG. 2, the processor 50 may be a general-purpose computer capable of, among other tasks, executing an operating system, executing device drivers, and executing specialized application software used in conjunction with various embodiments of the invention. In some embodiments, the processor 50 may be a special-purpose processor. Although the processor 50 is illustrated as a single device, in some embodiments, the functionality of the processor 50 may be distributed amongst multiple devices that may or may not be characterized as processors.

The processor 50 is capable of populating, updating, using and managing data in a processor-accessible memory 35, which is illustrated as part of the processor 50 in FIG. 2 though may be provided external to the processor 50 in some embodiments. Briefly, the memory 35 is a volatile storage device (e.g., RAM) and/or a non-volatile, non-transitory storage device (e.g., ROM, EPROM, EEPROM, hard drive(s), flash drive(s) or other solid state memory technology, CD-ROM, DVD) capable of storing, among any other information, data, device drivers (e.g., for sending control signaling 54 to one or more MV pixels 12), and specialized application software which, when executed, enable the processor 50 to perform various computations and processing as described in the present disclosure. Although the memory 35 is illustrated as a single device, in various embodiments, the memory 35 may be divided into multiple storage devices.

The processor 50 receives, via the input node 16, the specification of the multiple viewing zones 18a and 18b, for example, from the UI device 20 (see FIG. 5A) or from the sensor 26 (see FIG. 5B).

The processor 50 associates multiple contents with the multiple viewing zones 18a and 18b. This may be done by associating the multiple contents themselves with the multiple viewing zones 18a and 18b, or by associating multiple content descriptors, such as multiple content providers (e.g., cable channels, movie channels, live stream sources, news websites, social websites) or multiple content types, with the multiple viewing zones 18a and 18b.

The processor 50 determines (e.g., identifies, accesses) a mapping that translates between the viewing zone coordinate system 40 and the beamlet coordinate system 42 (FIG. 6). In various embodiments, a mapping between the viewing zone coordinate system 40 and the beamlet coordinate system 42 is generated and stored (or pre-stored) in the memory 35, which the processor 50 may access. In other embodiments, the processor 50 may generate a mapping between the viewing zone coordinate system 40 and the beamlet coordinate system 42 during runtime using a real-time calibration process.

The mapping may take any of various forms, such as a table or a mathematical relationship expressed in one or more translational functions. In some embodiments, the mapping may be based on registration of reference indicia (e.g., points, lines, shapes) defined in the viewing zone coordinate system 40 and in the beamlet coordinate system 42. For example, a first camera attached to the one or more MV pixels 12 is used to capture images of a viewing area 23 of the MV pixels 12. A registration device (not shown) including a second camera and a light source (e.g., an LED) is placed in the viewing area, and the light source is flashed, which is captured by the first camera of the MV pixels 12. The location of the flashing light in the viewing area as imaged by the first camera may serve as a reference in the viewing zone coordinate system 40 (which may be based on the coordinate system of the first camera). Encoding patterns (e.g., Gray-code patterns, non-return-to-zero (NRZ) digital sequences, amplitude-shift-keyed (ASK) bits, maximum-length sequences, shift-register sequences) are flashed on the one or more MV pixels (by selectively turning on and off the beamlets on each MV pixel) to uniquely encode every beamlet emitted from each MV pixel. The beamlet from each MV pixel that is captured by the second camera of the registration device placed in the viewing area may be identified (because each beamlet is uniquely encoded) and used as a reference in the beamlet coordinate system 42. The same process may be repeated with the registration device moved to different positions in the viewing area, to thereby obtain a set of references in the viewing zone coordinate system 40 and a set of references in the beamlet coordinate system 42. The mapping that translates between the two coordinate systems 40 and 42 may be found so as to register, align or otherwise correlate these two sets of references in the two coordinate systems. Any other registration techniques in image processing, such as automatic 3D point cloud registration, may also be used to perform the registration.

Figure 7A:
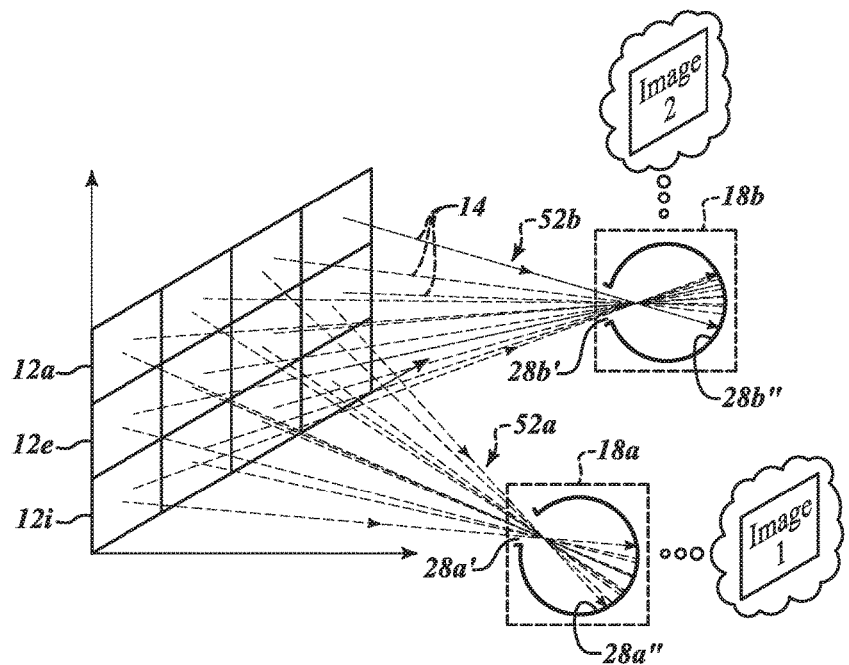
FIG. 7A depicts a sample process of using a mapping, which translates between the viewing zone coordinate system and the beamlet coordinate system, to identify a bundle of beamlets from the one or more MV pixels directed to each of the multiple viewing zones to form a corresponding image.

As illustrated in FIG. 7A, for each of multiple images ("IMAGE 1" and "IMAGE 2") generated from the multiple contents, the processor 50, using (applying) the mapping determined (e.g., identified, accessed, generated) above, identifies a bundle of beamlets 14 from each of the MV pixels 12a-12l directed to one viewing zone 18 to form the image. As illustrated, each bundle 52a or 52b includes the beamlets 14 that are "hitting" the pupil 28a' or 28b' and spread to the retina 28a'' or 28b'' of the viewer 28a or 28b to form "IMAGE 1" or "IMAGE 2" in each viewer's brain. The bundle 52a of beamlets 14 directed to the pupil 28a' in one viewing zone 18a to form one image "IMAGE 1" in the viewer 28a's brain is different from the bundle 52b of beamlets 14 directed to the pupil 28b' in another viewing zone 18b to form another image "IMAGE 2" In the viewer 28b's brain. As shown in FIG. 1, the processor 50 outputs control signaling 54 for the MV pixels 12a-12l. The control signaling 54 defines color and brightness (and any other imaging parameters as desired) of each of the beamlets 14 in each bundle 52 to project the corresponding image to the corresponding viewing zone 18. The MV pixels 12a-12l, in response to the control signaling 54 from the processor 50, project the multiple images to the multiple viewing zones, respectively.

Figure 7B:
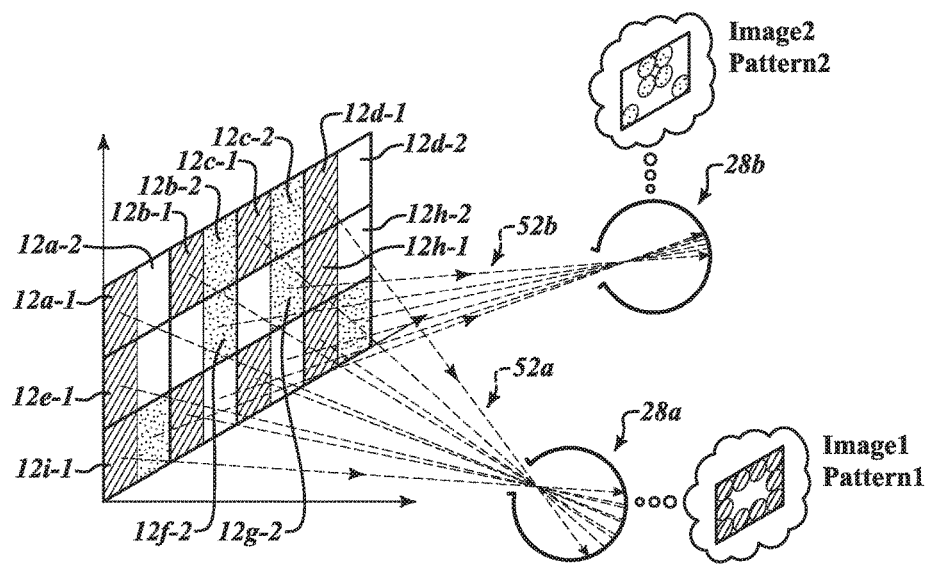
FIG. 7B depicts an example in which the MV pixels project different bundles of beamlets to different viewing zones, respectively, to present different images (IMAGE 1 and IMAGE 2 having different patterns) to the eyes located at the viewing zones.
Figure 7C:
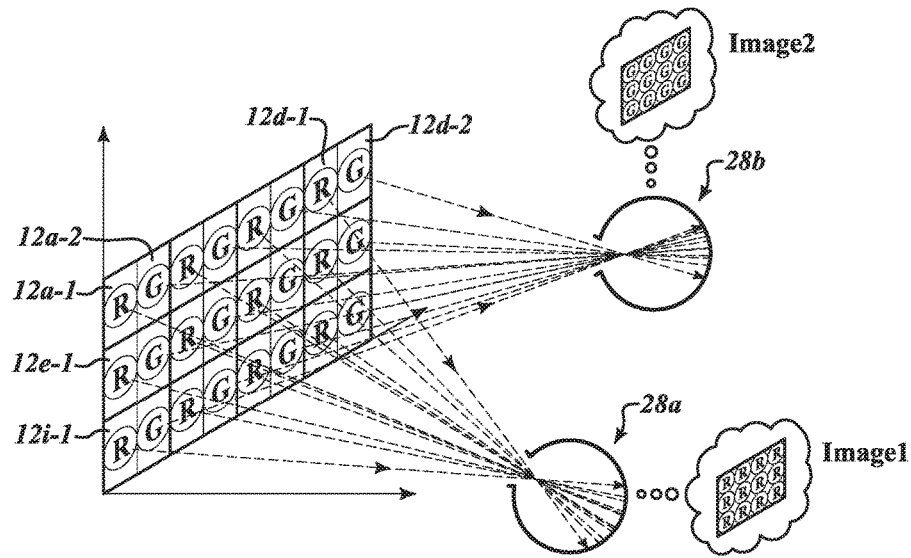
FIG. 7C depicts another example in which the MV pixels project different bundles of beamlets to different viewing zones, respectively, to present different images (IMAGE 1 and IMAGE 2 having different colors) to the eyes located at the viewing zones.

FIGS. 7B and 7C depict examples in which the MV pixels 12a-12l function to form two different images for two different viewers located at two viewing zones. In FIGS. 7B and 7C, each MV pixel is divided into two sections (e.g., 12a-1 & 12a-2), and it is assumed that the first sections (12a-1, 12b-1, 12c-1, et seq.) emit beamlets directed to the first viewing zone where the viewer (or the viewer's eye) 28a is located, while the second sections (12a-2, 12b-2, 12c-2, et seq.) emit beamlets directed to the second viewing zone where the viewer (or the viewer's eye) 28b is located. The control signaling 54 defines color and brightness of each of the beamlets 14 in each bundle to project the corresponding image to the corresponding viewing zone.

In FIG. 7B, the first sections of ten (10) MV pixels that form a rectangular pattern (12a-12d, 12e, 12h, and 12i-12l) emit beamlets having the color and brightness represented by "hatching" to the eye of the viewer 28a such that the viewer 28a sees IMAGE 1 having Pattern 1. The second sections of six (6) MV pixels (12b-12c, 12f-12g, 12i and 12l) emit beamlets having the color and brightness represented by "blotching" to the viewer 28b such that the viewer 28b sees IMAGE 2 having Pattern 2 that is different from Pattern 1 of IMAGE 1.

In FIG. 7C, the first sections of all twelve (12) MV pixels (12a-12l) emit beamlets having the color and brightness represented by "R" to the eye of the viewer 28a such that the viewer 28a sees IMAGE 1 in red. The second sections of all twelve (12) MV pixels (12a-12l) emit beamlets having the color and brightness represented by "G" to the viewer 28b such that the viewer 28b sees IMAGE 2 in green.

In each of these examples, a bundle of beamlets 14 that will "hit" one viewing zone is identified, and the color and brightness of each of the beamlets in the bundle are set, by the control signaling 54, to correspond to the content associated with the viewing zone so as to form an image based on the content at the viewing zone.

As used herein, "image" means anything that results from a pattern of illumination from the one or more MV pixels 12. The pattern of illumination is generated by turning "on" or "off" each of the beamlets emitted from each MV pixel 12 and/or controlling color and brightness (intensity) of each of the beamlets. Non-limiting examples of an image include any one or a combination of a static image, a stream of images (e.g., video), a text pattern (e.g., messages, signage), a lighting pattern (e.g., beamlets individually or collectively blinked, flashed e.g., at different or varying speeds, at different brightness/dimness levels, at different brightness/dimness increase or decrease rates, etc., or otherwise turned "on" and "off"), and any other expression of content that is visible to human eyes.

In some embodiments, the control signaling 54 may define, in addition to color and brightness, other parameters of each of the beamlets 14, such as spectral composition, polarization, beamlet shape, beamlet profile, focus, spatial coherence, temporal coherence, and overlap with other beamlets. Specifically, beamlets generally do not have a sharp edge and thus adjacent beamlets may somewhat overlap. The degree of overlap may be controlled by one of the beamlet parameters.

The control signaling 54 for the MV pixels 12 may be output from the processor 50 via any suitable medium including wireline and/or wireless medium, and via any suitable protocol (e.g., Bluetooth, Wi-Fi, cellular, optical, ultrasound).

Figure 8A:
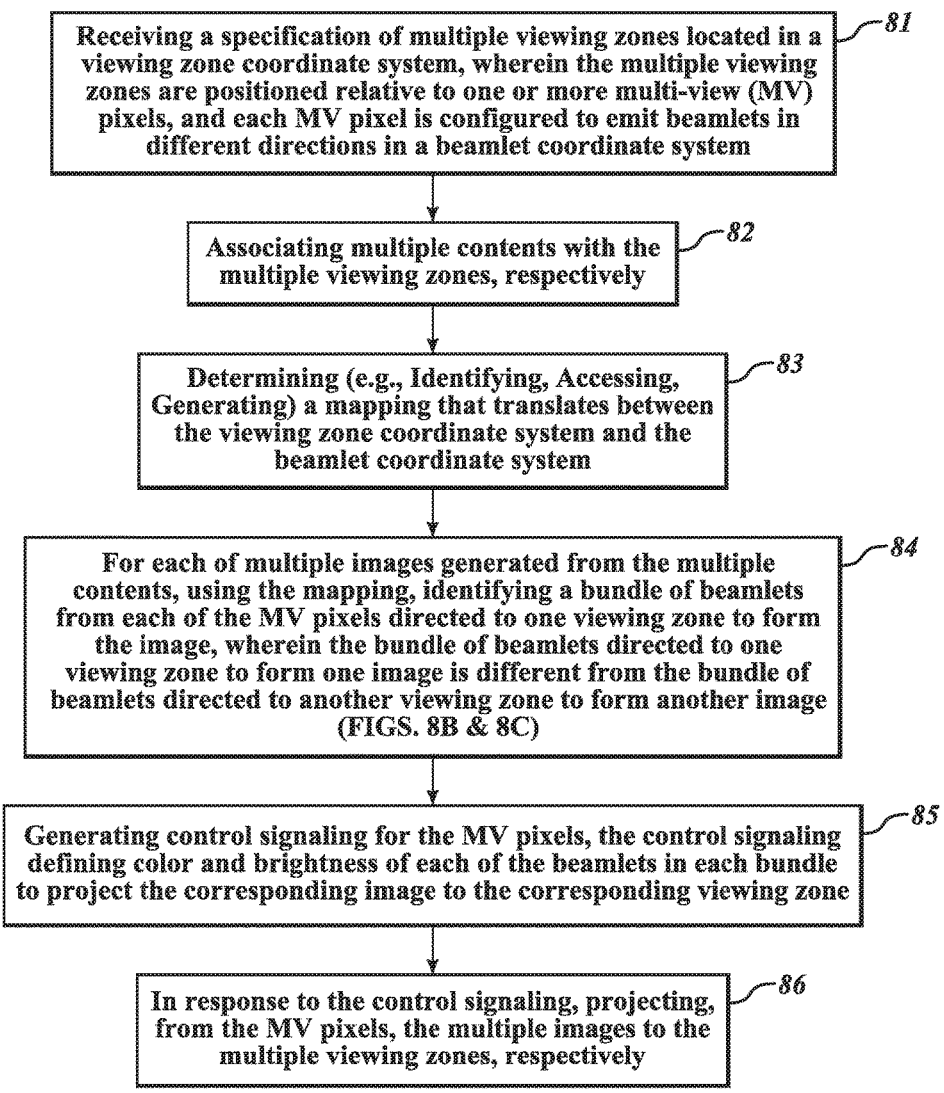
FIG. 8A is a flowchart depicting a display method of receiving a specification of multiple viewing zones and projecting multiple images to the multiple viewing zones, according to one embodiment.

FIG. 2 illustrates details of the processor 50 of the display system 10 according to one embodiment, and FIG. 8A is a flowchart illustrating a sample method that may be executed by the processor 50 in conjunction with the one or more MV pixels 12. Various components 32, 34, 36 and 38 in the processor 50 of FIG. 2, to be described in detail below, may be realized by hardware, software, or a combination of hardware and software, and each component may be partly or entirely realized by circuitry, a general-purpose processor or a special-purpose processor executing a software algorithm.

In block 81 of FIG. 8A, the processor 50 receives a specification of multiple viewing zones 18 located in a viewing zone coordinate system 40, wherein the multiple viewing zones are positioned relative to one or more multi-view (MV) pixels 12.

In the processor 50, a viewing zones processor 32 is responsible for processing the specification of the multiple viewing zones 18 as received via the input node 16. In some embodiments, the multiple viewing zones 18 as received via the input node 16 may be explicitly defined in the viewing zone coordinate system 40, for example, when the multiple viewing zones 18 are specified on the UI device 20 by an operator. In other embodiments, the multiple viewing zones 18 as received via the input node 16 may be implicitly defined, for example, in the form of the locations of multiple targets as identified by the sensor 26. In these embodiments, the viewing zones processor 32 receives the identified locations of multiple targets, and performs any necessary processing to explicitly specify the multiple viewing zones 18 based on the identified locations, such as by defining a point, a 2D shape, or a 3D shape that corresponds to each of the identified locations. The viewing zones processor 32 may use any of a number of image-processing techniques to process (e.g., recognize) the locations of multiple targets as identified by the sensor 26, such as stitching/registration, morphological filtering, thresholding, pixel counting, image segmentation, face detection, edge detection, and blob discovery and manipulation. The viewing zones processor 32 specifies multiple viewing zones based on the processed (e.g., recognized) locations of the multiple targets. In various embodiments, the multiple viewing zones may be stored in the memory 35 to be accessible by various components of the processor 50.

In block 82 of FIG. 8A, the processor 50 associates multiple contents with the multiple viewing zones 18, respectively. In the processor 50, a zones-and-contents association module 36 running an association application is responsible for carrying out the association. To that end, the memory 35 may store the multiple contents and/or content descriptors of the multiple contents. For example, multiple contents or content descriptors may be stored in one or more content servers networked together that collectively serve as part of the memory 35 accessible by the processor 50.

The multiple contents themselves (based on which images may be generated) may be stored, or the content descriptors (e.g., content providers, content types) may be stored that can be used to access the multiple contents, for example, via a network connection. In these embodiments, the zones-and-contents association module 36 may select a particular content or content descriptor for each viewing zone. In other embodiments, the zones-and contents association module 36 may create (generate) a particular content for each viewing zone.

The association program running on the zones-and-contents association module 36 is responsible for fetching or creating multiple contents for multiple viewing zones, respectively. The association program may refer to defined association rules to associate the multiple viewing zones 18 with multiple contents. For example, the rules may be used to select or create a particular content for each viewing zone based on the characteristics of the viewing zone or, if the sensor 26 is used to detect a location of a target (e.g., a viewer or a viewer surrogate) to specify a viewing zone, based on the characteristics of the target. As a specific example, multiple contents may be associated with the locations of the viewing zones relative to the one or more MV pixels 12, such that those contents can be used as bases to generate images that are particularly selected as appropriate for display at the locations. As another example, multiple contents are associated with the targets (e.g., viewers) at the viewing zones, such that those contents can be used as bases to generate images that are particularly selected as appropriate for the targets.

In further embodiments, the specification of the multiple viewing zones 18 as received via the input node 16 may be associated with multiple contents, respectively. For example, when the UI device 20 is used to specify the multiple viewing zones 18, the UI device 20 may additionally be used to associate the specified viewing zones 18 with multiple contents, respectively, based on an operator input into the UI device 20 for example. In these embodiments, the zones-and-contents association module 36 of the processor 50 receives and/or verifies the association between the viewing zones 18 and the multiple contents as received via the input node 16.

In some embodiments, multiple contents to be associated with the multiple viewing zones 18 may be generated in real time by the zones-and-contents association module 36. For example, the association application running on the zones-and-contents association module 36 may generate content (e.g., signage, a lighting pattern) in real time for each viewing zone, for example, as a function of the characteristics of the viewing zone.

In block 83 of FIG. 8A, the processor 50 determines (e.g., identifies, accesses, generates) a mapping that translates between the viewing zone coordinate system 40 and the beamlet coordinate system 42. In various embodiments, the mapping may be stored (or pre-stored) in the memory 35, in which case the processor 50 accesses the stored mapping. In the processor 50, a mapping engine 34 is responsible for determining (e.g., identifying, accessing, generating) the mapping.

Multiple mappings (e.g., one that translates from the viewing zone coordinate system 40 to the beamlet coordinate system 42, and another that translates from the beamlet coordinate system 42 to the viewing zone coordinate system 40) may be stored in the memory 35, and the mapping engine 34 may selectively access one or more suitable mapping(s) therefrom. In various embodiments, the mapping engine 34 determines (e.g., accesses) the mapping(s), and a beamlet-bundles identification module 38, to be described below, applies the mapping(s) to identify the bundle of beamlets that hit each viewing zone.

As described above, the mapping between the viewing zone coordinate system 40 and the beamlet coordinate system 42 may be pre-stored in the memory 35, or may be received into the memory 35 via the input node 16 at appropriate timings. For example, when the UI device 20 is used to specify the multiple viewing zones 18, the viewing zone coordinate system 40 used by the viewing zone specification application running on the UI device 20 may be used to generate a mapping, which may be received together with the specification of the multiple viewing zones 18, via the input node 16, from the UI device 20.

In block 84 of FIG. 8A, for each of multiple images generated from the multiple contents (associated with the multiple viewing zones in block 82, by the zones-and-content association module 36), using the mapping (determined/identified/accessed/generated) in block 83, by the mapping engine 34), the processor 50 identifies a bundle of beamlets from each of the MV pixels directed to one viewing zone to form the image. In the processor 50, a beamlet-bundles identification module 38 running a bundle identification application is responsible for applying the mapping to identify the multiple bundles 52a, 52b of beamlets directed to the multiple viewing zones 18a, 18b to form the multiple images, respectively (see the examples of FIGS. 7A, 7B and 7C, described above). Generally, the bundle identification application, for each of the images, identifies a bundle of beamlets that "hit" or "land" on/in the corresponding viewing zone to form the image.

Figure 8B:
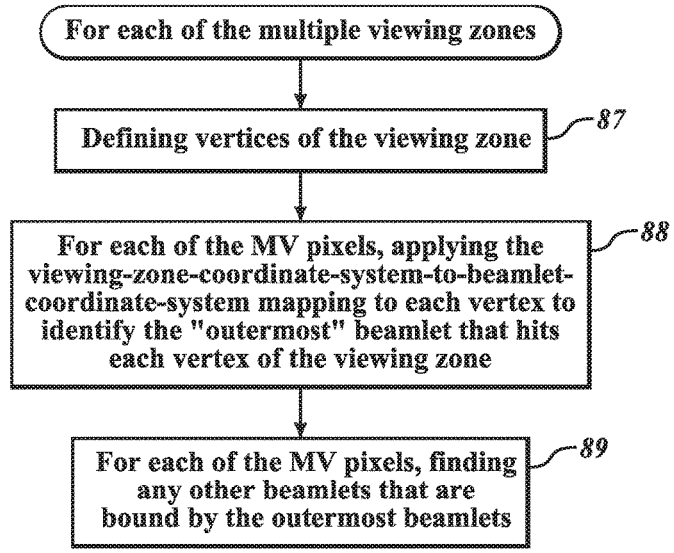
FIG. 8B is a flowchart of a sample algorithm that may be used to apply a mapping from the viewing zone coordinate system to the beamlet coordinate system, to thereby identify a bundle of beamlets.

FIG. 8B is a flowchart of a sample algorithm that may be used by the beamlet-bundles identification module 38 to apply a mapping from the viewing zone coordinate system 40 to the beamlet coordinate system 42, to thereby identify the bundle of beamlets directed to each of the multiple viewing zones. For each of the multiple viewing zones, in block 87, vertices of the viewing zone are defined. Referring to FIG. 5A, for example, for the viewing zone defined by the box 24, vertices P1-P8 are defined. In block 88, for each of the MV pixels, the mapping (from the viewing zone coordinate system to the beamlet coordinate system) is applied to each vertex to identify the outermost beamlet that "hits" each vertex of the viewing zone. As used herein, the outermost means toward the outer periphery of the MV pixel. In block 89, for each of the MV pixels, any other beamlets that are bound by the outermost beamlets that hit the vertices are found to also "hit" the viewing zone.

Figure 8C:
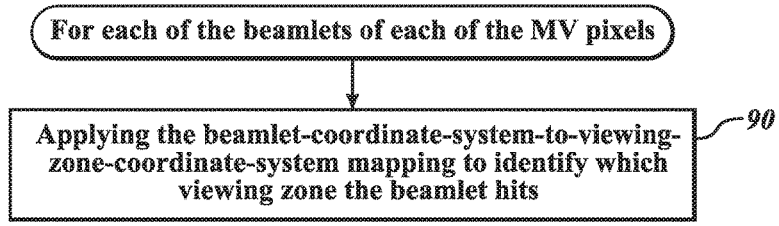
FIG. 8C is a flowchart of a sample algorithm that may be used to apply a mapping from the beamlet coordinate system to the viewing zone coordinate system, to thereby identify a bundle of beamlets.

FIG. 8C is a flowchart of a sample algorithm that may be used by the beamlet-bundles identification module 38 to apply a mapping from the beamlet coordinate system 42 to the viewing zone coordinate system 40, to thereby identify the bundle of beamlets directed to each of the multiple viewing zones. For each of the beamlets of each of the MV pixels, in block 90, the mapping (from the beamlet coordinate system to the viewing zone coordinate system) is applied to identify which viewing zone the beamlet "hits." After all the beamlets of each MV pixel are evaluated, each viewing zone is associated with a set of beamlets from the MV pixel that "hit" the viewing zone.

In block 85 of FIG. 8A, the processor 50 generates control signaling 54 for the MV pixels 12a-12l, wherein the control signaling 54 defines color and brightness of each of the beamlets in each bundle to project the corresponding image to the corresponding viewing zone. For example, the control signaling 54 may define, for each of the beamlets, color in YCbCr or in RGB space (e.g., a full palette of possible colors) including a transparency value ("a"), and brightness in a luminosity value ("L").

In block 86 of FIG. 8A, the one or more MV pixels 12a-12l, in response to the control signaling 54 from the processor 50, project the multiple images to the multiple viewing zones, respectively.

In some embodiments, the bundle of beamlets that form one image and the bundle of beamlets that form another image are mutually exclusive of each other. For example, in reference to FIGS. 7-7C, the bundle 52a of beamlets that map to the viewing zone from which viewers would see "IMAGE 1" and the bundle 52b of beamlets that map to the viewing zone from which viewers would see "IMAGE 2" are mutually exclusive of each other. In other embodiments, some of the beamlets may be shared by multiple images (i.e., by multiple bundles), for example, near the edges of the images to achieve blending effects or avoiding gaps between the viewing zones.

Figure 9A:
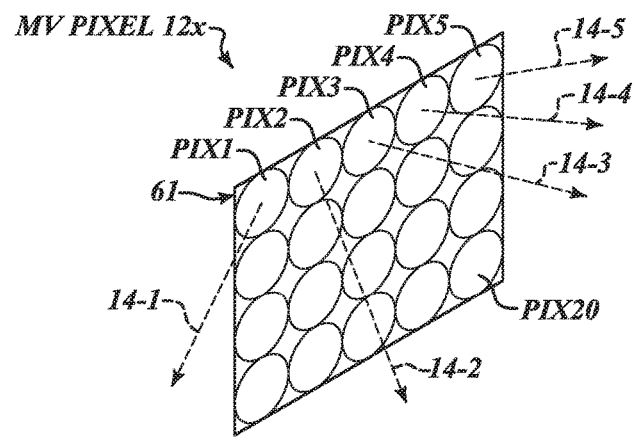
FIGS. 9A and 9B each illustrate an embodiment of an MV pixel formed of a projector including projector pixels capable of emitting multiple beamlets in different directions, respectively.
Figure 9B:
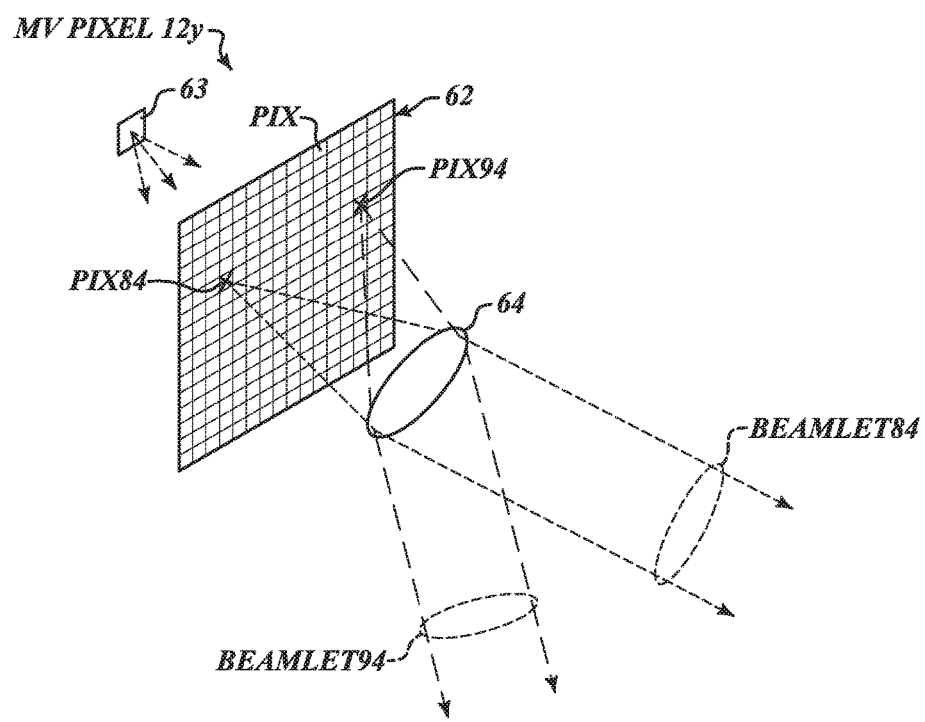
Figure 9C:
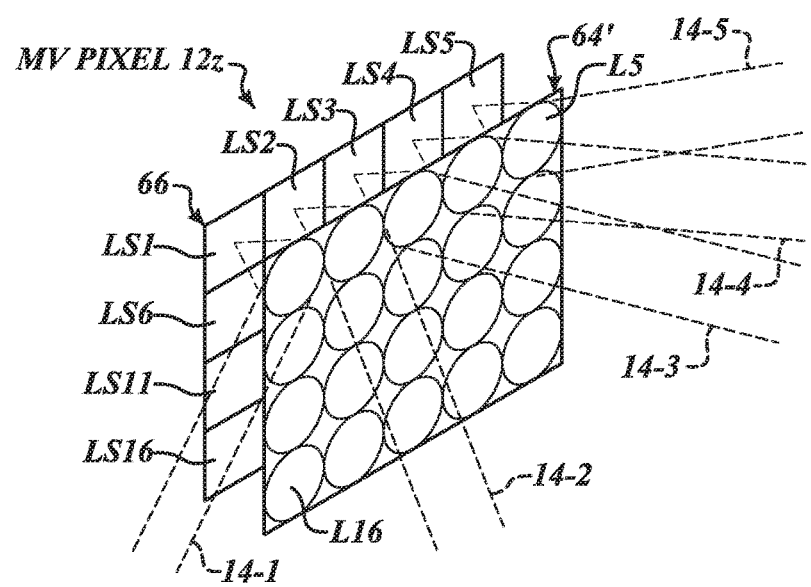
FIG. 9C is another embodiment of an MV pixel formed of a combination of a light source and a lens capable of splitting light from the light source into multiple beamlets in different directions.

The one or more MV pixels 12a-12l may be formed in any of various configurations. FIGS. 9A, 9B and 9C illustrate three non-limiting exemplary configurations of an MV pixel. FIG. 9A is a simplified representation of an MV pixel 12x formed of a projector 61 including multiple projector pixels ("PIX") each emitting a beamlet 14 in a certain direction. In the illustrated example, twenty (20) projector pixels, PIX 1-PIX 20, are included, each configured to emit a beamlet 14 in a different direction. Thus, twelve beamlets, 14-1-14-20, respectively emitted from the twelve projector pixels, PIX 1-PIX 20, extend in twenty different directions. The color and brightness of each of the beamlets from each of the projector pixels PIX are independently controllable. Any suitable projector (e.g., LCD, DLP, LCoS), such as a "pico-projector", may be used to form the MV pixel 12x. In various embodiments, projectors including 256 (=16×16) projector pixels to millions or more projector pixels may be used, including, without limitation:

*VGA:* 640×480=307,200 projector pixels

*XGA:* 1024×768=786,432 projector pixels

720*p:* 1280×720=921,600 projector pixels

1080*p:* 1920×1080=2,073,600 projector pixels

*UHD* 4K: 3840×2160=8,294,400 projector pixels.

Various pico-projectors suitable for use in forming the MV pixels are commercially available. Briefly, a pico-projector includes a light source (e.g., LED, laser, incandescent); collection optics, which direct the light to an imager; the imager, typically a DMD (digital micromirror device) or an LCoS (liquid-crystal-on-silicon) device, which accepts digital-display signals to shutter the light and direct the light to the projection optics; the projection (or output) optics, which project a display image on a screen and also permit additional functions such as focusing of the display image; and control electronics, including the light source drivers, interfacing circuits, and a video and graphics processor. In some embodiments, off-the-shelf pico-projectors may be modified for use as MV pixels, for example, to reduce brightness compared with conventional projection applications (as the beamlets 14 are intended to be received by viewers' eyes). The control signaling 54 from the processor 50 activates one or more of the MV pixels 12x to generate beamlets 14 from each of the MV pixels propagating in different directions, with color and brightness of each beamlet controlled.

FIG. 9B is a representation of another MV pixel 12y formed of a projector, which is more detailed than the representation of FIG. 9A. The MV pixel 12y includes a projector pixel array 62 consisting of projector pixels "PIX", a light source 63, and a lens 64. In the illustrated example, the projector pixel array 62 (e.g., a DMD or LCoS device) includes 256 (=16×16) projector pixels PIX 1-PIX 256. The light source 63 is depicted as being located behind the projector pixel array 62, though in other embodiments the light source 63 may be disposed in front of the projector pixel array 62, as a function of the projection technology being used. When the control signaling 54 from the processor 50 activates selected projection pixels "PIX", the light from the light source 63 impinging on those projection pixels is directed (via reflection or transmission) toward the lens 64, which generates beamlets from the received light. As illustrated, projection pixel PIX 84, when activated, directs the light from the light source 63 toward the lens 64, which collects a sizable fraction of that light and collimates it into BEAMLET 84. Similarly, projection pixel PIX 94, when activated, directs the light from the light source 63 toward the lens 64, which collects a sizable fraction of that light and collimates it into BEAMLET 94. Because the projection pixels PIX 84 and PIX 94 have a different angular orientation (in 1 or 2 directions) with respect to the lens 64, the emission directions of their respective BEAMLET 84 and BEAMLET 94 will differ from one another. If, for example, projection pixel PIX 84 passes blue light when activated, then a viewer whose eye receives BEAMLET 84 will see a blue dot. If, for example, projection pixel PIX 94 passes red light when activated, then a viewer whose eye receives BEAMLET 94 will see a red dot. The size/shape/ appearance of the dot may vary as a function of the configuration and operation of the lens 64. As a result, each beamlet (BEAMLET 1-BEAMLET 256) can differ from some or all of the other beamlets in terms of not only color and/or intensity but also of size, shape and/or appearance. When the projection pixel "PIX" each emits only one of the three primary colors (RBG), a diffuser may be positioned in front of a set of the projection pixels so as to diffuse the light emitted from the set, thereby blending together the light emitted from the set into a single beamlet of a color selected from a full palette of possible colors. In various embodiments, each projection pixel consists of three primary color "sub" pixels, and the diffuser is used to blend the three primary color "sub" pixels together into a full palette color of the projection pixel.

In other embodiments, as shown in FIG. 9C, an MV pixel 12z may be formed by a display panel (e.g., LED, OLED) 66 over which a lens or an array of lenses 64' is placed. Each display panel pixel functions as an individually addressable light source that emits light when electrically excited by the control signaling 54 from the processor 50. In the illustrated example, 4×5 array of the display panel pixels function as twenty light sources LS 1-LS 20, over which 4×5 array 64' of twenty lenses L1-L20 are placed. Light from display pixel LS 1 is collected and collimated by lens L1 into beamlet 14-1, light from display pixel LS 2 is collected and collimated by lens L2 into beamlet 14-2, light from display pixel LS 3 is collected and collimated by lens L3 into beamlet 14-3, and so forth, to generate twenty beamlets 14-1-14-20 propagating in twenty different directions. The display panel 66, which includes the display panel pixels (LS 1-LS 20) functioning as individually addressable light sources, may be collectively considered as a light source, and the array of lenses 64' may be collectively considered as a lens. The MV pixel 12z of FIG. 9C may thus be considered as a combination of a light source and a lens, which is configured to split light from the light source into multiple beamlets in different directions. The configuration of the light source and the lens is not limited to the particular embodiment illustrated in FIG. 9C, as will be apparent to those skilled in the art. For example, a single light source capable of emitting multiple light beams time-divisionally or spatial-divisionally may be used in place of the display panel 66, and other arrangements of a lens or lens array may be used in place of the array of lenses 64' of FIG. 9C. In FIG. 9C the array of lenses 64' are shown as floating in space and no support structure is shown. In practice, the lenses L1-L20 may be supported, for example, by a dark sheet that provides not only mechanical support but also an opaque background, and may block stray light from the display panel 66. Of the light from the display panel 66, only the beamlets 14 that pass through the lenses L1-L20 will reach the viewer's eyes.

The lens array and display panel combination to form an MV pixel may be implemented conceptually similarly to how a projector is constructed. For example, an LCD or OLED panel may be used, wherein the pixels of the LCD/OLED panel are functionally analogous to the projector pixels on the DLP/LCoS projector. With an LCD/OLED panel, it may be possible to place more than one lens in front of it to create multiple "projectors" out of a single display panel. The display panel pixels underneath each lens would form the beamlets that exit out of that lens. The number of display panel pixels underneath each lens determines the number of controllable beamlet directions for each MV pixel "projector".

In still further embodiments, a collection of individual lights (e.g., LEDs, spotlights), each pointing in a different direction and each being individually addressable, may be grouped together to form an MV pixel, which emits multiple beamlets originating from different lights in different directions.

Figure 10A:
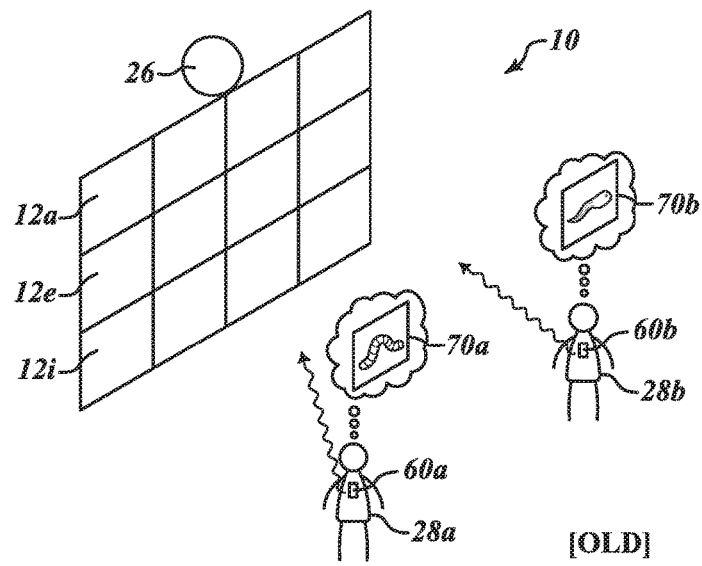
FIGS. 10A and 10B illustrate updating of images conveyed to multiple viewing zones as the viewing zones move from old locations to new locations.
Figure 10B:
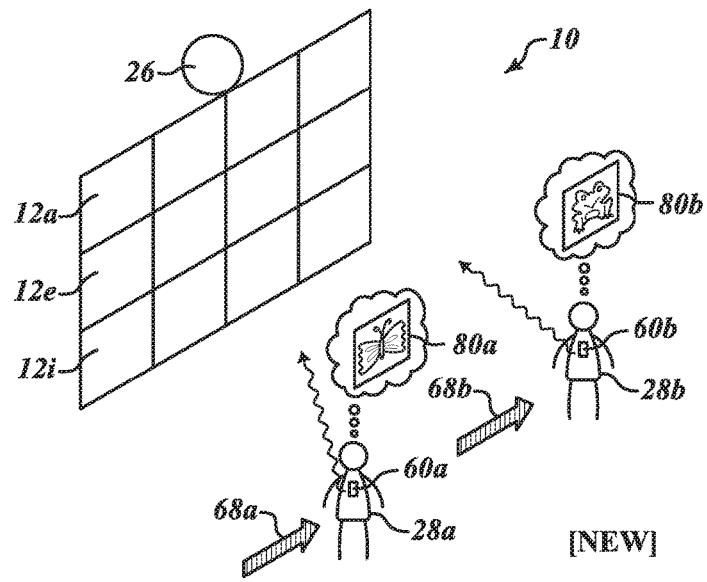

Referring back to FIG. 5B, the sensor 26 may be used to detect locations of multiple targets (e.g., multiple viewers 28a, 28b) that are moving and to specify the new detected locations of the multiple targets as new multiple viewing zones. The processor 50 may then update the multiple contents so that new images may be generated from the updated multiple contents to be visible at the new multiple viewing zones. FIGS. 10A and 10B illustrate such embodiments.

In FIGS. 10A and 10B, the multiple targets identified by the sensor 26 are not the multiple viewers 28a, 28b themselves, but are multiple viewer surrogates 60a, 60b, i.e., elements used to locate and/or track the multiple viewers 28a, 28b, such as tags (e.g., passive patterns such as QR code, active optical tags such as blinking IR LEDs, radio tags such as RFID tags, or ultrasonic tags) the viewers may wear (e.g., incorporated in a badge, wrist band), mobile devices (e.g., smartphones, wands) functioning as trackable objects that the viewers may carry, conveyances that may transport the viewers such as vehicles, or any other types of markers that may represent the viewers. The sensor 26 is configured to detect locations of the viewer surrogates 60a, 60b, using any suitable location technologies or techniques such as RFID technology, EM interrogation technology, or GPS technology. When the sensor 26 is used to detect locations of the multiple targets 28a, 28b (via the viewer surrogates 60a, 60b) which are moving from the original locations in FIG. 10A to the new locations in FIG. 10B, as indicated by arrows 68a, 68b, the input node 16 of the display system 10 may receive a new specification of new multiple viewing zones based on the new detected locations. The processor 50 associates multiple contents with the new multiple viewing zones, respectively, and, for each of the multiple images generated from the multiple contents, uses the mapping that translates between the beamlet coordinate system 42 and the viewing zone coordinate system 40 to identify a bundle of beamlets from each of the MV pixels directed to each new viewing zone to form the image. The display system 10 is capable of projecting the multiple images to the new multiple viewing zones, respectively.

In some embodiments, the multiple contents associated with the new multiple viewing zones may be updated from the multiple contents previously associated with the (old) multiple viewing zones. For example, in FIG. 10A, an image of a caterpillar 70a generated from an old content is projected to an old viewing zone of the viewer 28a, and an image of a tadpole 70b generated from an old content is projected to an old viewing zone of the other viewer 28b. After both of the viewers 28a, 28b have moved to new locations, in FIG. 10B, a different (updated) image of a butterfly 80a generated from an updated content is projected to a new viewing zone of the viewer 28a, and a different (updated) image of a frog 80b generated from an updated content is projected to a new viewing zone of the other viewer 28b. Thus, each viewer may observe updated or changing images (e.g., from caterpillar 70a to butterfly 80a, from tadpole 70b to frog 80b) based on the updated contents as the viewer moves relative to the one or more MV pixels 12, while different viewers 28a, 28b observe different (and differently updated or changed) images based on the updated contents, respectively.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display system comprising:
one or more multi-view (MV) pixels, wherein each MV pixel is configured to emit beamlets in different directions in a beamlet coordinate system;
an input node which, in operation, receives a specification of multiple viewing zones for multiple viewers, respectively, located relative to the MV pixels in a viewing zone coordinate system; and
a processor which is coupled to the input node and which, in operation:
determines a mapping that translates between the viewing zone coordinate system and the beamlet coordinate system;
in response to the specification of the multiple viewing zones,
associates multiple contents with the multiple viewing zones, respectively; and
for each of multiple images generated from the multiple contents, using the mapping, identifies a bundle of beamlets from each of the MV pixels directed to one viewing zone to form the image, wherein the bundle of beamlets directed to one viewing zone to form one image for one viewer is different from the bundle of beamlets directed to another viewing zone to form another image for another viewer different from said one viewer; and
outputs control signaling for the MV pixels, the control signaling defining color and brightness of each of the beamlets in each bundle to project the corresponding image to the corresponding viewing zone;
wherein the MV pixels, in response to the control signaling from the processor, projects the multiple images to the multiple viewing zones, respectively.

2. The display system of claim 1, wherein the image is selected from a group consisting of a static image, a stream of images, a text pattern, and a lighting pattern.

3. The display system of claim 1, wherein the processor associates the multiple contents with the multiple viewing zones by associating the multiple contents themselves with the multiple viewing zones or by associating multiple content descriptors of the multiple contents with the multiple viewing zones.

4. The display system of claim 1, comprising a user-interface device which, in operation, receives an operator specification of the multiple viewing zones and sends the specification of the multiple viewing zones to the input node.

5. The display system of claim 4, wherein the user-interface device includes a screen capable of displaying a viewing area and specifying the multiple viewing zones in the viewing area in response to one or both of graphical input and textual input.

6. The display system of claim 1, comprising a sensor configured to identify the multiple viewing zones and send the specification of the multiple viewing zones to the input node.

7. The display system of claim 6, wherein the sensor is configured to detect locations of multiple targets and specify the detected locations of the multiple targets as the multiple viewing zones.

8. The display system of claim 7, wherein the multiple targets include one or both of multiple viewers and multiple viewer surrogates.

9. The display system of claim 7, wherein,
the input node, in operation,
receives a new specification of new multiple viewing zones based on the detected locations of the multiple targets, which have moved, and
the processor, in operation:
associates the multiple contents with the new multiple viewing zones, respectively,
for each of the multiple images generated from the multiple contents, using the mapping, identifies a bundle of beamlets from each of the MV pixels directed to one new viewing zone to form the image, and
outputs new control signaling defining color and brightness of each of the beamlets in each bundle to project the corresponding image to the corresponding new viewing zone;
wherein the MV pixels, in response to the new control signaling, projects the multiple images to the new multiple viewing zones, respectively.

10. The display system of claim 9, wherein the multiple contents associated with the new multiple viewing zones are updated from the multiple contents, based on which the multiple images were previously projected to the multiple viewing zones.

11. The display system of claim 1, wherein the bundle of beamlets that form one image and the bundle of beamlets that form another image are mutually exclusive of each other.

12. The display system of claim 1, wherein each MV pixel is a projector having projector pixels that emit the beamlets in the different directions.

13. The display system of claim 1, wherein each MV pixel is a combination of a light source and a lens, wherein the lens is configured to split light from the light source into the beamlets in the different directions.

14. A display method comprising:
receiving a specification of multiple viewing zones located in a viewing zone coordinate system, wherein the multiple viewing zones are for multiple viewers, respectively, and positioned relative to one or more multi-view (MV) pixels, and each MV pixel is configured to emit beamlets in different directions in a beamlet coordinate system;
determining a mapping that translates between the viewing zone coordinate system and the beamlet coordinate system;
in response to the specification of the multiple viewing zones,
associating multiple contents with the multiple viewing zones, respectively; and
for each of multiple images generated from the multiple contents, using the mapping, identifying a bundle of beamlets from each of the MV pixels directed to one viewing zone to form the image, wherein the bundle of beamlets directed to one viewing zone to form one image for one viewer is different from the bundle of beamlets directed to another viewing zone to form another image for another viewer different from said one viewer;
generating control signaling for the MV pixels, the control signaling defining color and brightness of each of the beamlets in each bundle to project the corresponding image to the corresponding viewing zone; and
in response to the control signaling, projecting, from the MV pixels, the multiple images to the multiple viewing zones, respectively.

15. The display method of claim 14, wherein the step of associating the multiple contents with the multiple viewing zones includes associating the multiple contents themselves with the multiple viewing zones or associating multiple content descriptors of the multiple contents with the multiple viewing zones.

16. The display method of claim 14, wherein the step of receiving the specification of the multiple viewing zones includes receiving the specification via a user-interface device capable of receiving an operator specification of the multiple viewing zones.

17. The display method of claim 16, wherein the user-interface device includes a screen capable of displaying a viewing area and specifying the multiple viewing zones in the viewing area in response to one or both of graphical input and textual input.

18. The display method of claim 14, wherein the step of receiving the specification of the multiple viewing zones includes receiving the multiple viewing zones identified by a sensor.

19. The display method of claim 18, wherein the sensor is capable of detecting locations of multiple targets and specifying the detected locations of the multiple targets as the multiple viewing zones.

20. The display method of claim 19, comprising:
receiving a new specification of new multiple viewing zones based on the detected locations of the multiple targets, which have moved;
associating the multiple contents with the new multiple viewing zones, respectively;
for each of the multiple images generated from the multiple contents, using the mapping, identifying a bundle of beamlets from each of the MV pixels directed to one new viewing zone to form the image;
generating new control signaling defining color and brightness of each of the beamlets in each bundle to project the corresponding image to the corresponding new viewing zone; and
in response to the new control signaling, projecting, from the MV pixels, the multiple images to the new multiple viewing zones, respectively.

21. The display method of claim 20, comprising:
updating the multiple contents associated with the new multiple viewing zones from the multiple contents, based on which the multiple images were previously projected to the multiple viewing zones.

22. The display method of claim 14, wherein the image is selected from a group consisting of a static image, a stream of images, a text pattern, and a lighting pattern.

* * * * *